United States Patent [19]  [11] Patent Number: 4,694,446
Koike  [45] Date of Patent: Sep. 15, 1987

[54] SIMPLIFIED SOUND REPRODUCING DEVICE OF RANDOM SELECTING TYPE

[75] Inventor: Eishi Koike, Sagamihara, Japan

[73] Assignee: Ozen Corporation, Tokyo, Japan

[21] Appl. No.: 833,918

[22] Filed: Feb. 26, 1986

[30] Foreign Application Priority Data

Feb. 28, 1985 [JP] Japan ................................. 60-39040

[51] Int. Cl.⁴ ............................................. G11B 17/06
[52] U.S. Cl. ....................................... 369/67; 369/63; 369/65
[58] Field of Search ........................ 369/63, 65, 66, 67

[56] References Cited

U.S. PATENT DOCUMENTS 4,055,351 10/1977 Hughes ................................. 369/67
4,150,832 4/1979 Watanabe ............................. 369/67
4,347,595 8/1982 Ngai ..................................... 369/67
4,486,871 12/1984 Koike ................................... 369/67

Primary Examiner—Steven L. Stephan
Attorney, Agent, or Firm—Basile, Weintraub & Hanlon

[57] ABSTRACT

A simplified sound reproducing device for randomly selecting recordings to be reproduced, having a free gear formed with one or more intermittent tooth portions with tooth crest in the direction of rotation longer than that of other normal teeth. The gear system which includes this intermittent tooth portion is constructed such that this portion can contact any one gear tooth among other normal teeth of the mating gear in the gear system including the free gear and a center gear disposed at the center of the record disc. When the swing arm approaches the end point of sound reproduction at the urging of pickup, the free gear can engage the center gear. A cam member is interposed between the record disc and sound transmitting member. The cam member has two cam pieces axially stacked one on another such that the total length of the cam member can be lengthened when the two pieces are twisted. One upper piece 7 is capable of engagement with the free gear. When the free gear abuts the crest of tooth of a gear tooth in the mating gear of the gear system in the device and stops rotation against the driving force imparted by the center gear upper cam piece also stops resulting in elongation of the cam member. Because the location of the intermittent tooth portion is unpredictable with regard to the phase of rotation of the record disc the timing for initiating twisting action in the cam member which releases the stylus force is also made random.

11 Claims, 12 Drawing Figures

SIMPLIFIED SOUND REPRODUCING DEVICE OF RANDOM SELECTING TYPE

BACKGROUND OF THE INVENTION

1. Field of the Invention

This invention relates to a sound reproduction device of random selecting type. More particularly, this invention relates to a device in which the timing for releasing the stylus force imparted to the pickup of the device and then letting the pickup return to the starting point of sound reproduction is rendered irregular with respect to the timing where the pickup engages the introductory part of a record groove out of the plurality of record grooves, thereby making it is possible to enjoy the reproduced record items in a random manner.

2. Prior Art

Heretofore, there have been provided simplified sound reproduction devices designed for sound reproduction in a manner of random selection. These devices generally comprise:

a swing arm for releasing stylus force and carrying a free gear having an integrally formed upwardly facing cam;

a center gear fixed at the center of a record disc so as to be capable of being rotated integrally with the record disc; and a sound transmitting member disposed above the record disc and supported in a cantilevered manner to lift it upward by said upwardly facing cam.

In these conventional devices, once the pickup arrives at the end point of sound reproduction, it urges the swing arm so as to permit the free gear to mesh with the center gear causing the free gear to rotate with the rotation of the center gear, and in turn, actuate the cam to release the stylus force.

In this device, the number of parts is increased by interposing the free gear and using a backlash, often found in this kind of device, for randomly releasing stylus force as desired.

However, the extent of irregularity of randomness present in devices made according to the prior art was not satisfactory. The devices as previously designed gradually became inclined to select only specific items, afer having been used for large number of sound reproductions. This tendency becomes more marked when the device is made with more precision. Thus, the advantage obtained by increasing the number of parts is eliminated with respect to the attractive merit of irregularity or randomness in selecting the items to be played.

SUMMARY OF THE INVENTION

This invention aims to obviate the problems encountered in the prior art device. Accordingly, an object of the present invention is to provide a random selection type simplified sound reproducing device capable of reproducing the recorded items in a fully irregular or random manner.

Another object of the present invention is to provide a sound reproducing device which is well-designed and accurately made which permits fully random selection of the items to be reproduced.

By taking the aforesaid pending problems and objectives into account, the simplified sound reproducing device of the present invention is provided a free gear having at least one intermittent tooth portion having an enlarged area. The intermittent tooth portion has an elongated crest longer than that of other normal teeth.

The gear system including this intermittent tooth portion is constructed such that the tooth portion can contact any gear tooth from among other normal teeth of the mating gears in the gear system. These gears include the free gear and a center gear disposed at the center of the record disc, so that the free gear can engage the center gear when a swing arm for releasing the stylus force is pushed by the pickup when the pickup approaches the end point of sound reproduction.

In addition, a cam member consisting of two cam pieces axially stacked one on another is interposed between the record disc and the sound transmitting member. The cam member can be elongated by cam action caused by twisting between the two pieces. One piece of the cam member directly or indirectly engages the free gear.

When the free gear engages a mating gear in a gear system which includes the center gear and is stopped against the driving force imparted by the center gear, it will also stop the cam piece which directly or indirectly engages said free gear. This action causes twisting between the cam pieces and resultant lengthening in the cam member. By virtue of this construction, the timing for causing twisting in the cam member for the purpose of releasing the stylus force is rendered uncertain due to the uncertain position of the intermittent tooth in the free gear.

In the present invention, the free gear carried by the swing arm can also be freely rotated, when it is not in engagement with any other gear. Rotation can occur because of the work of reproducing sounds or by any other irregular vibration transmitted through the swing arm. As a consequence of this, the location of the intermittent tooth portion formed on the free gear can be varied from one reproduction to another in a totally random manner. Thus, the timing for causing lengthening in the cam member due to twisting in the member initiated by the intermittent tooth of the free gear can be varied from one playing to another. Because of this, the timing for raising up the sound transmitting member to release the pickup from the imparted stylus force so that it can return to the starting point of sound reproduction or for retracting the record disc, varies from one playing to another.

Since the location of the intermittent tooth portion can be varied by the vibration caused by the reproduction of the recorded items or other shock, the timing for releasing the stylus force imparted to the pickup for returning it to the starting point of sound reproduction can be made irregular or random relative to the time at which the pickup engages the introductory part of any record groove of the plurality of record grooves during the rotation of the record disc. Thus, the recorded items can be reproduced in an entirely irregular or random manner.

BRIEF DESCRIPTION OF THE DRAWINGS

In order to more fully understand the present invention, the following drawings are presented in which like reference numerals refer to like elements throughout the various drawing figures.

DETAILED DESCRIPTION OF THE PREFERRED EMBODIMENTS

A first embodiment of the simplified sound reproducing device of the present invention is shown in FIGS. 1, 2, 3, 4 and 5. In explaining this embodiment, portions common to all other embodiments will also be explained.

Figure 1:
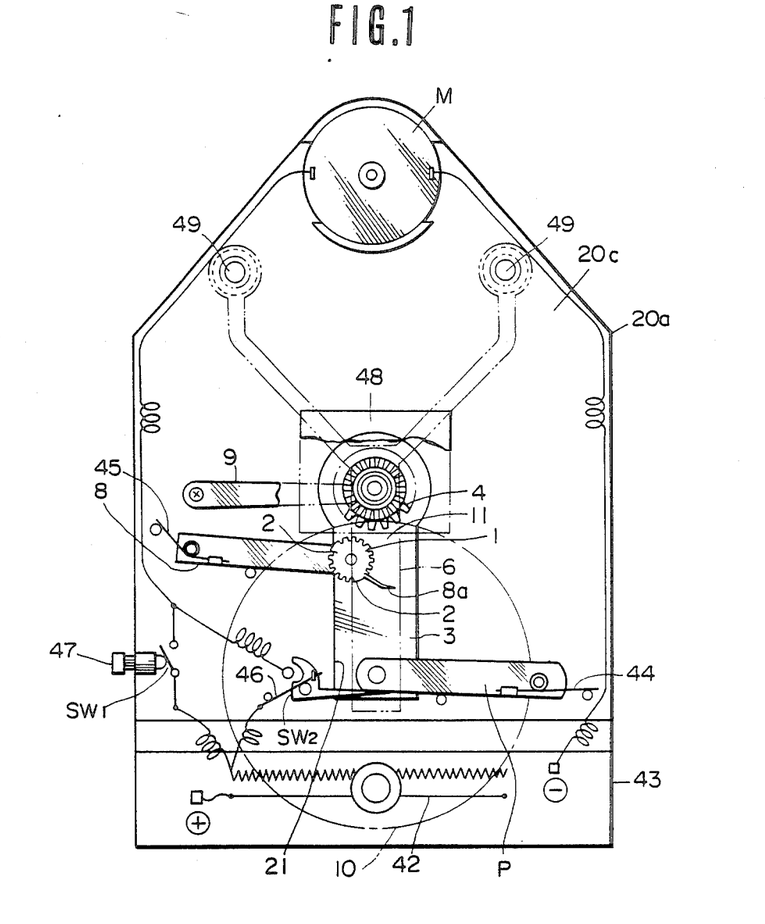
FIG. 1 is a plan view of a first embodiment of the present invention with the housing removed.
Figure 2:
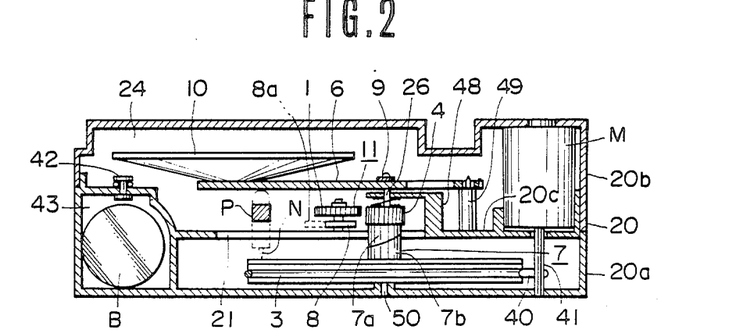
FIG. 2 is a sectional side elevation taken along the 2—2 line of FIG. 1 with the stylus force releasing means in the unactuated position.

As shown in FIGS. 1 and 2, a casing 20 consists of a chasses 20a, a housing 20b assembled thereto so as to cover the chasses 1a, and a middle deck 20c extending above the chasses 20a. The housing 20b defines a speaker box 24, in which a speaker diaphragm 10 is received.

The speaker diaphragm 10 comprises, at its bottom portion, an integrally attached sound transmitting member 6. As seen in FIG. 1, the sound transmitting member 6 has a configuration like a capital letter "Y" in plan view. The sound transmitting member 6 is supported at the forward tip end of the bifurcated arms by upstanding posts 49 affixed to the middle deck 20c. The remaining portion of the arms are allowed to swing up and down, in the manner of cantilevered suspension. The speaker diaphragm 10 is fixedly attached on and supported by the portion of the sound transmitting member 6 opposed to upstanding posts 49. Thus, the speaker diaphragm 10 will swingably move with the swinging motion of the sound transmitting member 6. A leaf spring 9 resiliently rests on the upper face of both arms of the Y-shaped sound transmitting member 6 to urge it downward toward the pickup P.

Figure 12:
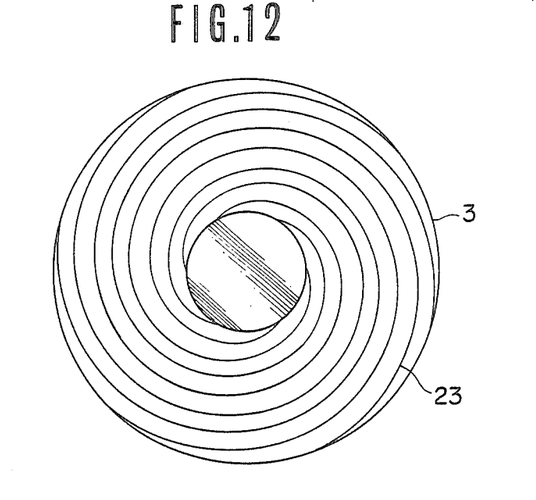
FIG. 12 is a plan view of a record disc used in any of the embodiments.

Disposed within the chassis 20a is a record disc 3 which is received by and freely rotates around a center pin 50. As shown in FIG. 12, the record disc 3 has six record grooves 23 with their guiding portions in the peripheral region starting from each of their starting points of sound reproduction set on the outermost periphery of the record disc.

A motor M for powering the sound reproducing device of the present invention is fixed at one end of the casing 20 above the middle deck 20c. The motor M has an output shaft 41 which extends into the chassis 20a. A belt 40 mechanically couples output shaft 41 with record disc 3 to effect rotation.

A pickup P and a swing arm 8 for releasing stylus force are pivotally attached to the mmiddle deck 20c. Rear end portions of the pickup P and swing arm 8 are normally resiliently urged toward the starting point of sound reproduction and upward, by return springs 44 and 45, respectively.

An operating lever 8a resiliently attached to the forward end of the swing arm 8 opposed to the point of pivotal attachment. The operating lever 8a extends over the rotational path of the tip end of the pickup P. A reproducing stylus N projects downward from the front bottom face of the pickup P.

Also present in the housing 20 is a battery box 4, a battery B and appropriate switches and wiring to power the device.

A first switch SW1 operates the entire electric system in the device and is attached to an operating button 47 to permit manipulation of the device from outside the casing 20. The speed of the device is controlled by a speed controller 42 using a rheostat.

A second switch SW2 is located at the return positionof the pickup at the starting point of sound reproduction. The second switch SW2 acts to cut off electric current to the motor M, upon arrival of the pickup P at the starting point of sound reproduction.

A bracket 48 for temporarily stopping rotation of the rotation of the first upper piece 7a of the cam member 7 is disposed on the upper face of the chasses 20a and above the central part of the record disc 3.

Above the center of the record disc and on the center pin a cam member 7 is formed. The cam member 7 consists of a first upper piece 7a which has an integrally formed center gear 4 at the upper part of the piece 7a and a second lower piece 7b located immediately under the upper piece 7a integral with the record disc 3. Both the record disc 3 and the cam member 7 are mounted on the center pin 50 so as to be freely movable in the direction of rotation.

Figure 4:
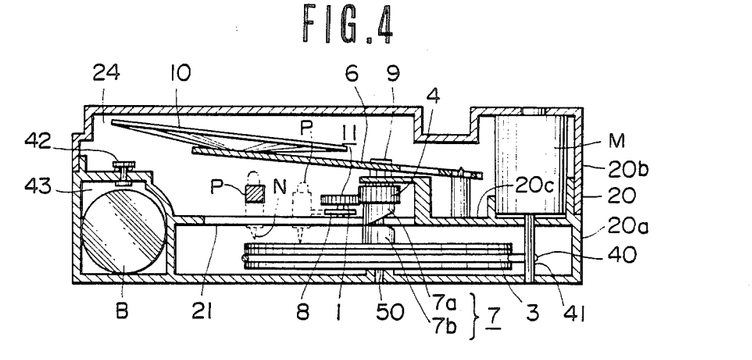
FIG. 4 is a sectional view taken along the 2—2 line of FIG. 1 in which the stylus force releasing means is in its actuated position.

FIG. 2 shows the cam member 7 with full stable coupling with the two mating pieces 7a and 7b in full mating engagement over their entire contact surfaces. However, if the first upper piece 7a stops while the record disc 3, together with the other piece 7b, continues rotating, a twisting action arises, as shown in FIG. 4. The two mating cam surfaces of first upper piece 7a and second lower piece 7b separate from each other by this twisting action causing the length of the cam member is lengthened as a whole.

Figure 3:
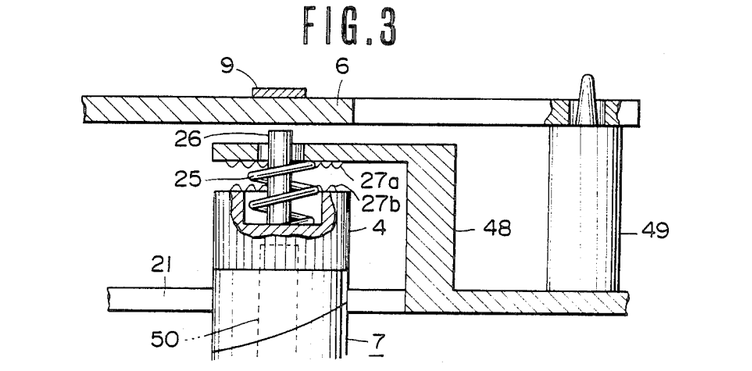
FIG. 3 is an enlarged sectional view of the stylus force releasing means partly enlarged and partly fragmented.

As shown in FIG. 3, in detail, the center gear 4 is provided at its upper face with an axially bored recess. A discrete pushing rod 26 is uprightly disposed within the recess concentrical with the center pin 50. A cam stabilizing spring 25 is assembled under compression between the bottom face of the recess and the lower face of the bracket 48. The pushing rod 26 projects further upward passing through a hole opened through the bracket 48 such that the top end of pushing rod 26 extends to a position slightly under the bifurcated arms of the sound transmitting member 6.

A pair of friction clutch pieces 27b and 27a are formed on the circumferential edge face defining the recess of the center gear 4 and the lower face of the bracket 48 facing with the aforesaid edge face, respectively. When the cam member 7 is fully elongated, the friction clutch pieces 27b and 27a engage to obstruct or block the rotation of the center gear 4.

As shown in FIG. 1, a free gear 1 having gear teeth is rotatably disposed on the tip end of the swing arm 8 is a free gear 1. Most of the gear teeth formed have regular pitch and profile identical to the pitch of the teeth of the center gear 4. Thus, when the free gear 1 and center gear 4 are meshed, the free gear 1 can be driven by the center gear 4.

The free gear 1 has at least one intermittent tooth. The intermittent tooth has a tooth crest longer than the crest of the normal teeth of the center gear 4. Accordingly, the moment the intermittent tooth comes in contact with the center gear 4, function of the two mating gears is obstructed and they can no more continue regular rotation.

Sound reproduction is initiated by placing the first switch SW1 in the ON position by depressing the operating button 47. In this switch position, the motor M is supplied with electricity and the record disc 3 will begin to rotate. The reproduction stylus N on the pickup P is maintained in contact with the record disc 3 by the force imparted by stylus force spring 9 through sound transmitting member 6. The pickup P will engage any one of the record grooves 23 shown in FIG. 12 and be guided along the groove toward the end point of sound reproduction.

At the end point of sound reproduction, the second switch SW2 which, up to this point, has been OFF, is turned ON when the pickup contacts it. This constitutes a bypass, so the electric current to the motor M powers the motor even if the first switch SW1 is turned OFF by releasing operator pressure on the operating button 47.

At the moment the pickup P arrives at the end point of sound reproduction positioned at the central region of the record disc 3, the pickup P contacts the operating lever 8a of swing arm 8. The pickup P urges the free gear 1 located on the forward portion of the swing arm 8 toward the center gear 4 so that the free gear 1 engages the center gear 4. Since the center gear 4 is still rotating together with the record disc 3, it also urges the free gear 1 to rotate.

When the intermittent portion, namely, the intermittent tooth of the free gear comes into contact the center gear 4, the tooth crest having different length from normal teeth cannot continue cooperative gear action with the center gear 4, and thus both the free gear 1 and the center gear 4 stop their rotation.

When the center gear 4 stops, the first upper piece 7a of the cam member 7 integral with the center gear 4 will also stop rotation. The second lower cam piece 7b will continue to rotate together with the record disc 3. This creates a twisting action between the two mating cam surfaces 7a and 7b.

Due to the cam action of the cam member 7 as shown by FIG. 4, the cam member 7 is elongated. Elongation of the cam member urges the pushing rod 26 upward against the sound transmitting member 6. This forces the sound transmitting member 6 pivotally upward against the resilient force imparted by the stylus force spring 9 thereby releasing exerted on the pickup P. Once freed of stylus pressure, the pickup P is urged away from the record face of the record disc 3 and back to the starting point of sound reproduction by the return spring 44.

When the pickup P returns to the starting point of sound reproduction, the swing arm 8 is released from contact with the center gear 4. The center gear 4, at this point, has already been released from the blocked rotation imparted by the free gear 1, but it can be still held from rotation by the friction clutch members 27a and 27b until their final disengagement. The two friction clutch members 27a and 27b mesh with each other while the record disc 3 and the lower cam piece 7b continue to rotate. This is accompanied by a gradual decrease in the length of the cam member 7 due to its cam action.

As a consequence, the first upper piece 7a of the cam member 7 and the center gear 4 are prevented from rotating with the other cam piece 7b. Thus, the cam member 7 is prevented from maintaining its elongated state for long periods of time and thereby holding the record disc in a non-operative state without being imparted with a necessary stylus force.

When the cam member 7 reverts back to its initial length with full contact of the mating cam faces of first upper cam piece 7a and second lower cam piece 7b, the pickup P which has already returned to the starting point of sound reproduction and is imparted with stylus force and lowered, so that the reproduction stylus N can engage the record face of the record disc 3.

The time in which the reproduction stylus N falls onto the record face of the record disc 3, depends on the time when the stylus force applied to the pickup P is released. Timing also determines into which groove of the plural number of record grooves the pickup P will fall during the subsequent rotation of the record disc 3. The timing during which the sound transmitting member 6 is lifted up by the lengthening of the cam member 7 is decided by the position where the intermittent tooth portion 2 formed on the free gear 1 situates in the phase of rotation when the free gear 1 meshes the center gear 4.

Since the free gear 1 is attached to the swing arm 8 and is capable of free rotation, it can be readily rotated by movements as mild as vibrations due to sound reproduction as well as by any shock to operating the sound reproducing device. It is to be understood, the location of the intermittent portion 2 of free gear 1 cannot be seen from outside the casing 20. Thus, its location with respect to the phase of rotation becomes unpredictable.

The plurality of grooves 23 also cannot be checked from outside the casing 20. However, selection of these grooves 23 depends on the timing of the pickup P returning to the starting point of sound reproduction. This process proceeds in a random manner which effects the subsequent descent of the pickup P onto the face of the record disc 3.

The pickup P, upon its arrival at the point of sound reproduction, moves the second switch SW2 to the OFF position and cuts the power to the motor M which stops the rotation of the record disc 3 until the operator depresses operating button 47 and begins the process again.

EMBODIMENT 2

Figure 5:
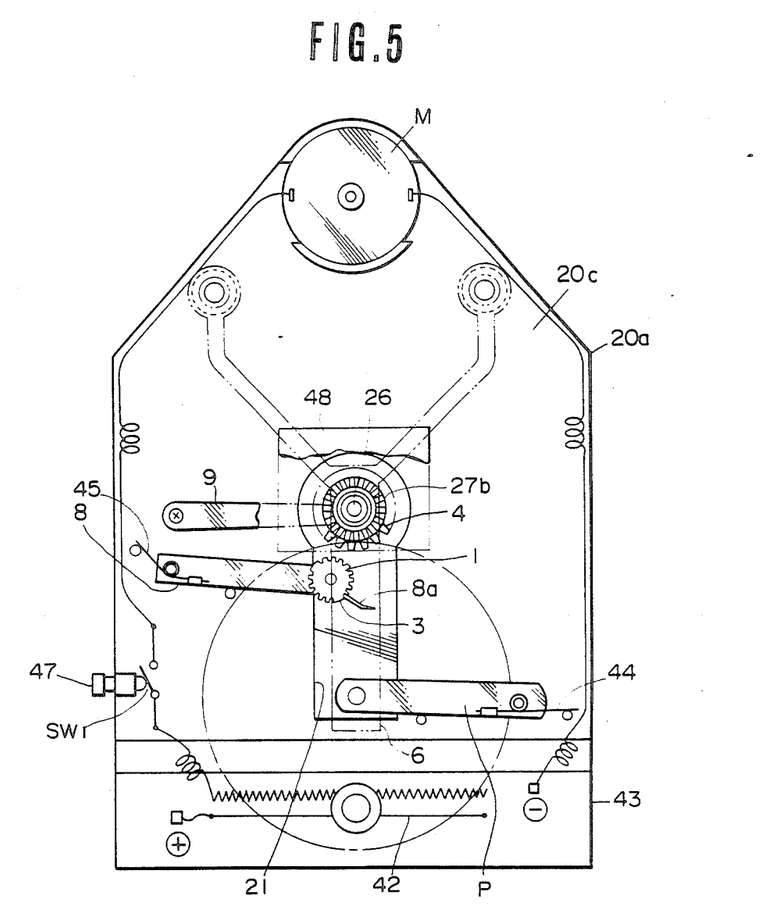
FIG. 5 is a plan view of a second embodiment of the present invention having a switch means of different construction and with its housing having been removed.
Figure 6:
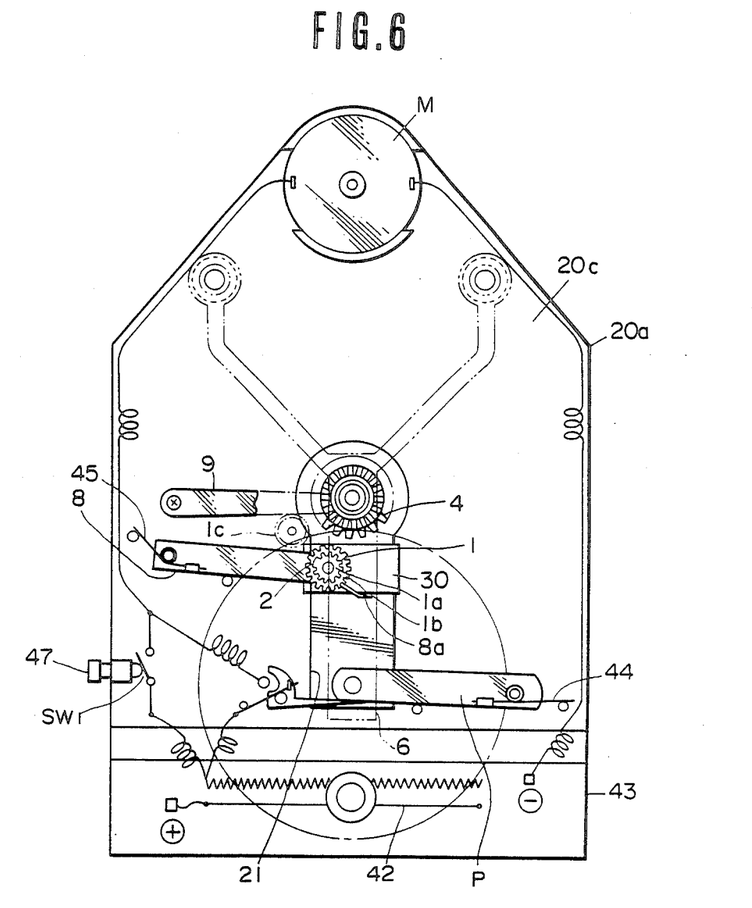
FIG. 6 is a plan view of a third embodiment of the device of the present invention with the housing having been removed.
Figure 7:
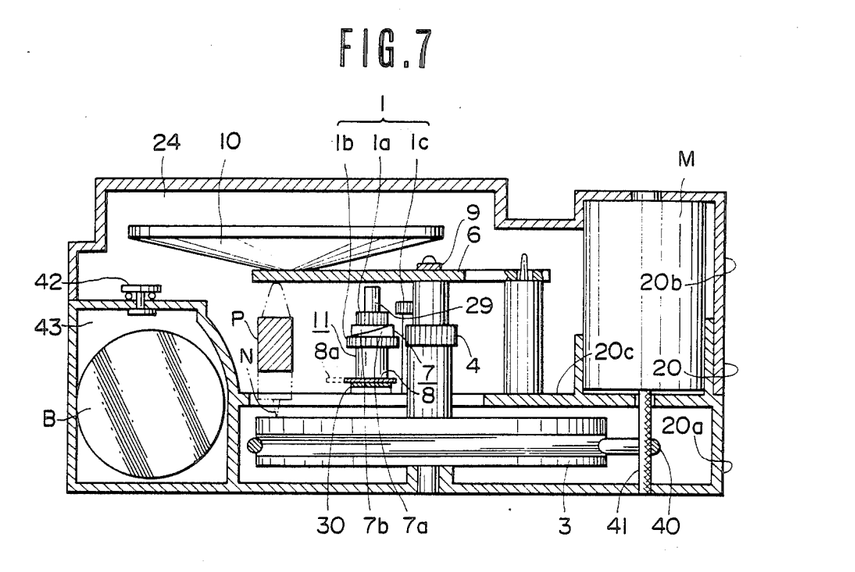
FIG. 7 is a sectional side view of the third embodiment of the present invention taken along the 7—7 line of FIG. 6.
Figure 8:
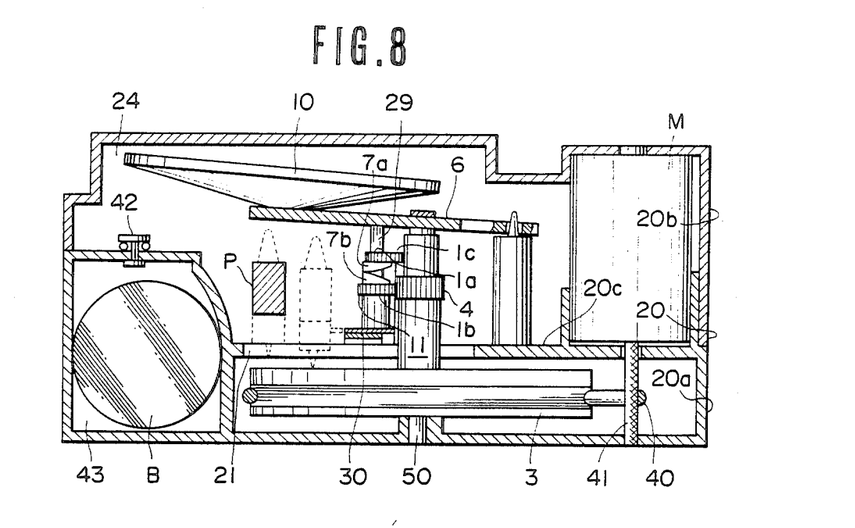
FIG. 8 is a sectional side view taken along the 6—6 line showing the stylus force releasing means has shifted from the state shown in FIG. 7 to its actuated state.
Figure 9:
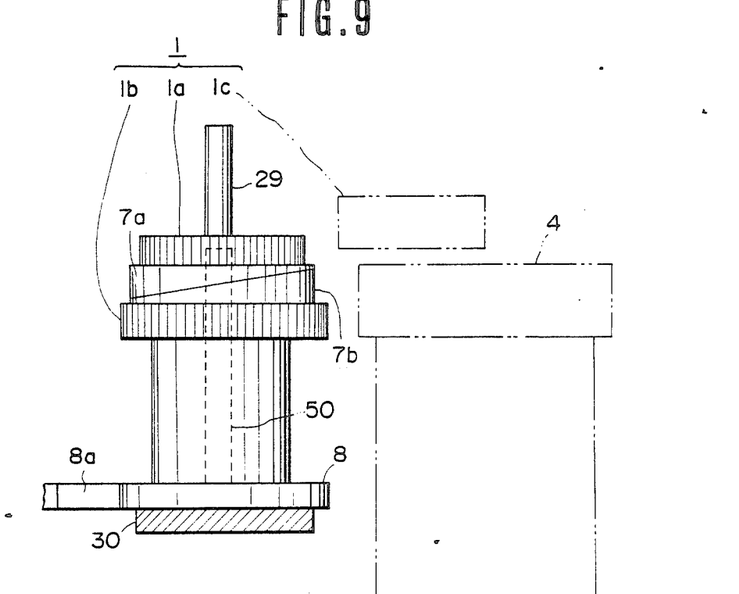
FIG. 9 is a sectional view of the third embodiment with the stylus force releasing means being partly enlarged.

The present invention can also be effected by a second embodiment as shown in FIG. 5. This embodiment has a similar construction to that of the first embodiment, but lacks the second switch SW2. This enables the device to be used for continuous sound reproduction.

According to this embodiment, since the supply of electric current to the motor M is not cut off by the return of the pickup to the starting point of sound reproduction, the device can perform continued reproduction in an entirely random manner as long as the first switch SW1 is held ON.

EMBODIMENT 3

The present invention also contemplates a third embodiment as shown in FIGS. 6, 7, 8 and 9. According to this embodiment, a cam member 7 and a pushing rod 29 in a stylus force releasing mechanism are carried by the swing arm 8. The pushing rod 29 on the swing arm 8 acts to lift the sound transmitting member 6 out of engagement with the pickup P.

The free gear mechanism 1 in this embodiment consists of a first gear 1a fixed to an upper cam piece 7a of a cam member 7 and a second gear 1b fixed to a lower piece 7b which can mesh with the center gear 4, and a third gear 1c disposed at a suitable position on the middle deck 20c such that it can be meshed with the first gear 1a concurrent with the meshing of the second gear 1b with the center gear 4. An intermittent tooth 2 is formed among the teeth of the first gear 1a. A similar intermittent tooth may be formed on the third gear 1c (not shown).

According to this embodiment, when the second gear 1b rotates after being meshed with the center gear 4, the first gear 1a meshes the third gear 1c and rotates accordingly. Due to its construction, after some amount of rotation, the intermittent tooth 2 blocks further rotation and any associated rotation of the first upper piece 7a of the cam member 7 to which the first gear 1a is attached.

The means for releasing stylus force operates in substantially the same fashion as discussed in the first embodiment with the exception of the construction of the cam member 7, arrangement of the pushing rod 29 and the free gear comprising the third gear 1c.

In this embodiment, a supporting plate 30 slidably receives the forward tip end of swing arm 8.

The pushing rod 29 and the cam member 7 are supported on the swing arm 8. As long as the cam member 7 is in its lengthened state the pushing rod 29 supports the sound transmitting member 6. In this position, the free gear 1 will not move immediately away from the center gear 4 due to the friction contact of the pushing rod 29 with the lower face of the sound transmitting member 6.

EMBODIMENT 4

Figure 10:
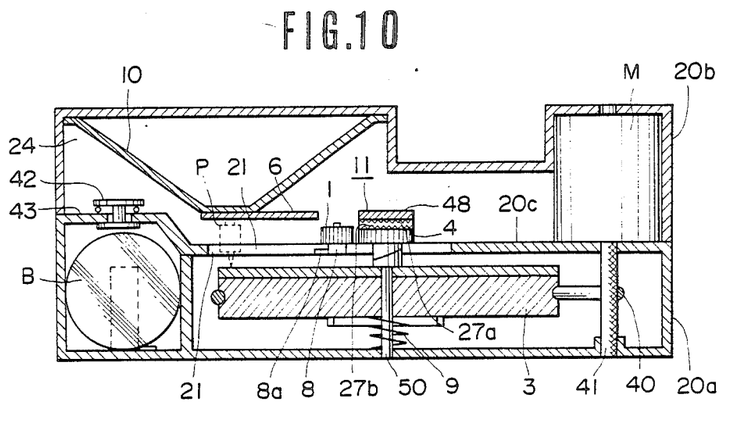
FIG. 10 is a sectional view of a fourth embodiment of the present invention taken along the center line.
Figure 11:
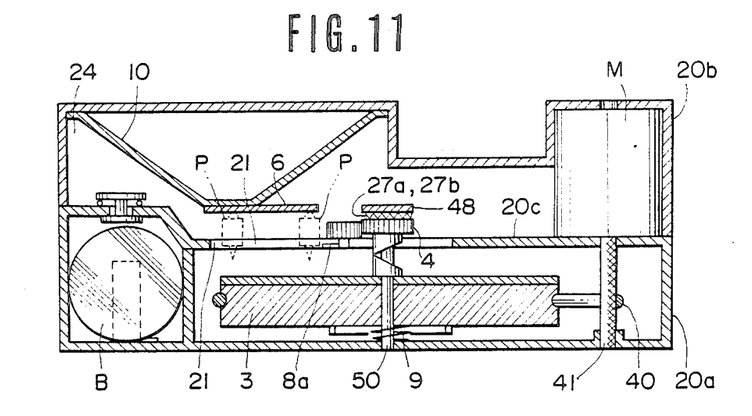
FIG. 11 is a sectional view taken along the lengthwise center line of the device of FIG. 10 showing the stylus force releasing means shifted to the actuated state form the state shown in FIG. 10.

A fourth embodiment of the present invention is shown in FIGS. 10 and 11. In this embodiment, a speaker diaphragm 10 is fixedly attached to the inner face of the speaker box 24 in the casing 20. As a result, the sound transmitting member 6 is fixedly mounted together with the speaker box 24, within the casing 20.

The stylus force spring in this embodiment is a coil spring, which is disposed under the record disc 3 and around the center pin 50. The stylus force releasing mechanism is entirely the same as that used in the first embodiment. The stylus force mechanism operates to urge the record disc 3 downward against the force of the stylus force spring 9 when the stylus releasing mechanism operates.

Having, thus, described my invention, what is claimed is:

1. A simplified sound reproducing device of random selection type comprising:

a casing;
   a speaker diaphragm having a top and bottom portion;
   a sound transmitting member attached to the bottom of said speaker diaphragm;
   a record disc having a starting point and end point of sound reproduction for each of a plurality of record grooves;
   a motor for driving said record disc;
   a pickup interposed between the sound transmitting member and the record disc, the pickup normally urged resiliently toward the starting point of sound reproduction and away from the recorded face of said record disc;
   a stylus force spring imparting resilient stylus force to said pickup;
   a center gear having a plurality of teeth disposed at the central part of said record disc rotatable together with said record disc;
   a swing arm for releasing stylus force swingably disposed near the end point of sound reproduction so as to be extended to the path of rotation of said pickup, the swing arm normally urged toward the starting point of sound reproduction;
   a free gear carried by the swing arm and rotatable by the driving force transmitted from the record disc through the center gear when the swing arm has been urged by the pickup and has moved toward the center gear, thereby carrying the free gear into engagement with the center gear, the free gear having a plurality of teeth, at least one of which has a tooth crest in the direction of rotation longer than the other teeth such that said longer tooth crest can contact any tooth crest of the teeth of the mating center gear, and stop rotation of both the free gear and the center gear; and
   a stylus force releasing mechanism interposed between the sound transmitting member and the record disc, the stylus force releasing mechanism having a cam member including an upper cam piece and a lower cam piece axially stacked one on another, the upper cam piece being releasably coupled to the center gear, the cam member initiating cam action for releasing the stylus force applied to the pickup by widening a space located between said sound transmitting member and said record disc when the free gear has advanced to the position where it engages the center gear and stops rotation of the free gear against the driving force imparted by the center gear, thereby causing the cam member to elongate due to twisting and cam action.

2. The device of claim 1, wherein the lower cam piece is disposed at the center of said record disc so as to be integral therewith, and the center gear is integrally attached to the upper cam piece of the cam member, the upper cam piece of said cam member being coupled to the free gear through the center gear.

3. The device of claim 1 further comprising a source of electric current, wherein the motor is electrically connected such that the electric current to the motor is cut off when the pickup arrives at a starting point of sound reproduction of the record disc.

4. The device of claim 1 further comprising a source of electric current, wherein the motor is electrically connected such that the electric current to the motor is maintained when the pickup is situated at a starting point of sound reproduction of the record disc.

5. The device of claim 1, wherein the speaker diaphragm is swingably supported in a cantilevered manner together with said sound transmitting member, the stylus force spring thereby imparting necessary stylus force to urge the sound transmitting member toward the record disc, and the cam member is disposed below the sound transmitting member at the center of said record disc such that the cam member can lift and urge the sound transmitting member against the resilient force imparted by said stylus force spring.

6. The device of claim 1, wherein said speaker diaphragm is swingably supported in a cantilevered manner on the sound transmitting member, and the cam member is disposed below the sound transmitting member and at the center of said record disc such that the cam member can lift up the sound transmitting member against the resilient force imparted by the stylus force spring, thereby preventing the further blocked rotation of the record disc by the engagement of the intermittent tooth portion of said free gear with the tooth crest of said center gear when the cam member is extended to its maximum length.

7. The device of claim 1, wherein the speaker diaphragm is swingably supported in a cantilevered manner on the sound transmitting member, the stylus force spring thereby imparting necessary stylus force to urge said sound transmitting member toward the pickup and maintain the pickup in contact with the record disc; said cam member is carried by said swing arm such that it can lift up said sound transmitting member against the resilient force imparted by said stylus force spring; and the free gear includes a first gear fixed to the first upper piece of the cam member carried by the swing arm, a second gear fixed to the second lower piece of the cam member, the second gear being capable of meshing with the center gear, and a third gear rotatably supported at a suitable position on the casing such that it can mesh with the first gear concurrent with the meshing of the second gear with the center gear.

8. The device of claim 7, wherein the longer tooth crest is formed on the first gear.

9. The device of claim 7, wherein the longer tooth crest is formed on the third gear.

10. The device of claim 1, wherein the speaker diaphragm is fixedly attached within the casing, the sound transmitting member is fixedly attached to the bottom of said speaker diaphragm, the stylus force spring imparts necessary stylus force to the pickup through the record disc, and the cam member is disposed above said record disc such that it can urge the record disc against the resilient force imparted by the stylus force spring.

11. The device of claim 7 wherein the longer tooth crest is formed on the second gear.

* * * * *